United States Patent Office 3,226,215
Patented Dec. 28, 1965

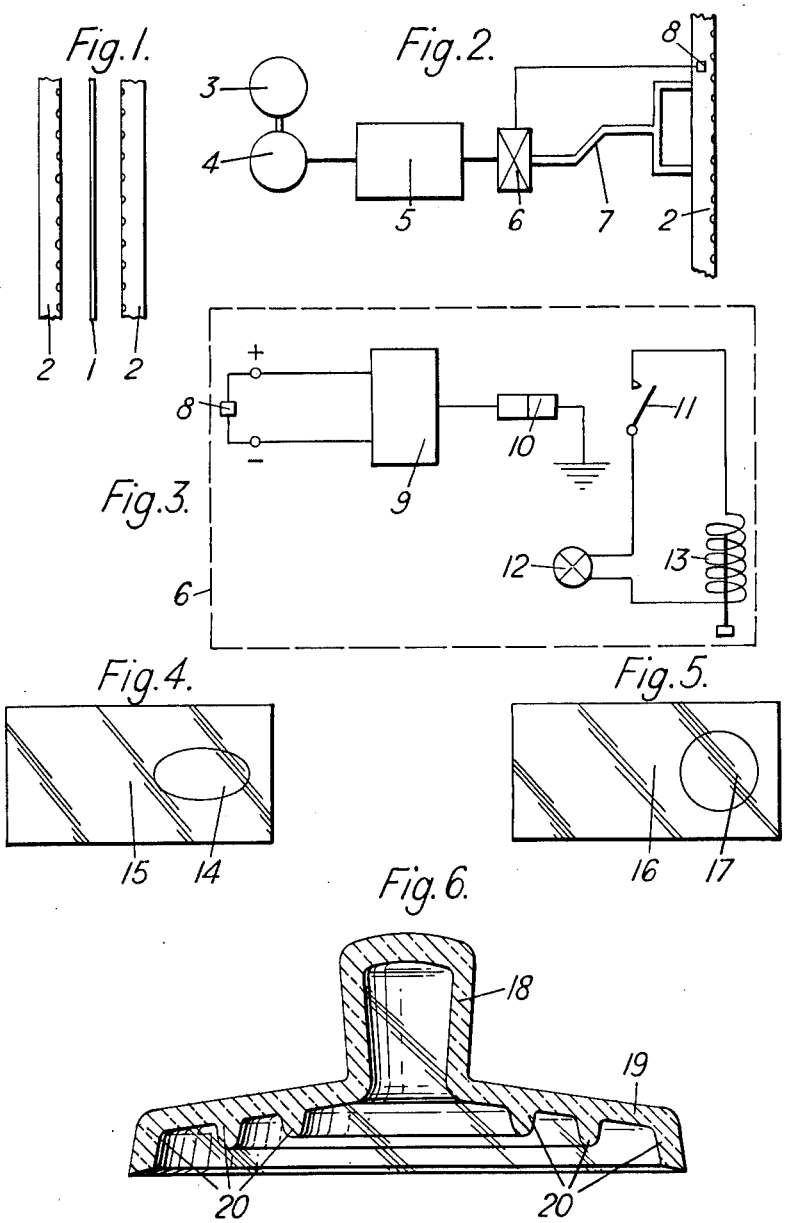

3,226,215
METHOD OF PRODUCING TOUGHENED GLASS
John Reginald Beattie, Maghull, near Liverpool, and Kenneth Jack Blackler Wolfe, Balsall Common, England, assignors to Pilkington Brothers Limited, Liverpool, England, a corporation of Great Britain
Filed Apr. 17, 1961, Ser. No. 103,313
Claims priority, application Great Britain, Apr. 20, 1960, 13,904/60
11 Claims. (Cl. 65—29)

This invention relates to methods of producing toughened glass and to articles including toughened glass so produced. One of the main objects of the invention is to regulate the size of the particles obtained when the toughened glass is fractured, a characteristic which in flat glass is usually known as the particle-count, that is the number of fracture particles per square inch of superficial area of the glass.

The term "glass articles" as used in this specification and the appended claims includes glass or glassware of any shape or for any purpose provided that the thickness of the glass in at least a part of the article to be toughened is sufficiently great for the temperature difference between the main body of the glass and the surfaces of the glass, which is discussed in the following paragraph, to appear. The practice of the invention, however, does not necessarily involve the toughening of all parts of the glass article which are of sufficient thickness to show the temperature difference.

The normal method of producing toughened glass consists of heating the glass article to a predetermined temperature, after which it is cooled by blowing for a given time and at a given pressure with jets of compressed air. This cooling or quenching process produces a temperature difference between the surfaces of the glass and the main body confined between the surfaces, and in particular the centre of the body. The temperature difference sets up stresses in the glass during the cooling, and the pressure of the cooling air and the time for which it is applied are chosen so that any glass of any thickness is cooled at least to the point at which these stresses are built permanently into the glass.

The resultant stress differential in the glass when finally cold depends upon the temperature difference when the main body of the glass passes below the strain point, so that it is the difference then which controls the particle-count.

This difference is, during cooling, affected by the thickness of the glass, by the glass temperature on removal from the furnace, and also by the pressure and volume of the cooling air used, and the effects are unalterable once all the glass has been appreciably cooled below the strain point.

The expression "relaxation temperature" used herein means in respect of any glass the temperature below which that glass has a viscosity high enough to hold the stresses which are present in the glass owing to the differences in temperature between the various parts of the glass. The relaxation temperature is not a fixed temperature for any given sample, but is a time-temperature effect depending upon the rate of cooling of the glass, so that for each glass there is a temperature range somewhere within which the relaxation temperature will lie in any given circumstances.

It is on account of the variations which occur in the relaxation temperature of any glass and in the time required to reduce any glass to that temperature, that it has been the practice in the past always to cool the glass quickly enough to obtain the desired stress differential between the centre and surface layers of the thinnest glass of a batch of glass sheets of nominally uniform thickness at the minimum pressure permissible for that batch, and for the cooling to be continued long enough to ensure that even the thickest glasses are cooled by the air jets at least to the point when no relaxation of the sresses can occur.

It has been found that the stress differential obtained by this method in thicker glasses of such a batch is greater than desired, with the result that the size of the particles formed when the glass is fractured is smaller than desired, i.e. the particle-count is too large.

Prolonged experiments have disclosed that control of particle-count depends on the accurate control of the conditions of quenching, and this is particularly true when it is desired to obtain a particle-count below 15 per square inch.

In some cases it is desired to keep the period of quenching to the minimum needed to obtain a toughening effect and it has been found that the temperature of the surface of the glass at the time that the passage of cooling air is stopped is very important in these circumstances. At the time that the quenching action ends, the temperature of the surface of the glass is below the relaxation temperature, but the temperature of the centre of the glass may still be appreciably above the relaxation temperature, so that the full stresses comparable with the temperature gradient throughout the glass will not be developed. After the quenching is finished, the temperature of the glass body evens out, with the result that the temperature of the surface of the glass rises and with an even shorter period of blow may go above the relaxation temperature so that the final stresses obtained in the glass are very much weaker than desired.

As a consequence of this effect the particle-count of any glass quenched under otherwise constant conditions rises approximately proportionally to the time of quenching or blowing until a certain maximum particle-count is reached. The instant at which blowing is terminated is thus another important factor in control of the particle-count.

The main object of the present invention is to assure control during the cooling or quenching operation, in order to produce accurately in the toughened glass a stress differential characteristic, which gives particles of a desired average size if the glass is fractured.

According to the present invention there is provided a method of toughening at least a part of a glass article by heating the glass article above the relaxation temperature of the glass and then exposing the heated glass article to the quenching action of a gaseous chilling medium directed at the glass article, characterised by measuring energy radiated from the heated glass being toughened and employing said measurement to control the delivery of the gaseous chilling medium used in the toughening process.

The invention has particular advantages in the manufacture of toughened plate glass for the windscreens and windows of vehicles and in the manufacture of hollow articles, for example insulators for supporting electric cables.

According to a feature of the present invention, there is provided a method of toughening at least a part of a glass article by heating the glass article above the relaxation temperature of the glass and then exposing the heated glass article to the quenching action of a gaseous chilling medium directed at the glass article, characterised by using an indication of the surface temperature of the heated glass article to control the delivery of the gaseous chilling medium used in the toughening process.

When the article to be toughened is a sheet of glass, this is uniformly heated above the relaxation temperature of the glass, and the heated glass article is exposed to the quenching action of a gaseous chilling medium simultaneously directed to both faces of the sheet of glass.

According to a further feature of the present invention there is provided a method of toughening a glass article formed from a sheet of glass by uniformly heating the glass sheet above the relaxation temperature of the glass, exposing the heated glass sheet to the quenching action of a gaseous chilling medium simultaneously directed to both faces of the sheet of glass, until the surface of the glass has cooled below the relaxation temperature of the glass, and thereafter regulating the delivery of the chilling medium by using a measurement of energy radiated from the heated glass sheet in order that the temperature of the surface of the glass sheet shall not be raised above a predetermined value by residual heat in the main body confined between the surfaces of the glass to prescribe the particle-count in the toughened article.

Preferably the delivery of the gaseous chilling medium is regulated in accordance with the surface temperature of the glass sheet.

Conveniently the regulation of the gaseous chilling method is effected by a pyrometer which measures the temperature of the surface of the glass sheet.

As an alternative the regulation of the chilling medium may be effected by two pyrometers responsive to the radiation emitted respectively from the surface of the glass article and from the main body and surface thereof.

The regulation of the flow of the gaseous chilling medium may be used to maintain a desired temperature difference between the surface of the glass and the interior of the glass during cooling through the relaxation temperature.

The pyrometer which is used to measure the temperature of the surface of the glass during cooling is an optical pyrometer, which is rendered sensitive only to radiations in the wavelength range $5-9\mu$ by means of suitable optical filters. A lead selenide filter is preferred for this purpose. Within this wavelength range of $5-9\mu$ glass 0.03 mm. and greater in thickness is opaque and therefore radiation received by the pyrometer must come from the surface layer of the glass.

According to another aspect of the invention there is provided apparatus for carrying out the method of toughening a glass article, which apparatus includes quenching means for directing the gaseous chilling medium onto at least a part of the glass article, and thermo-sensitive control means for determining the temperature of the glass during quenching and for applying to the quenching means a control sensitive to energy radiated from the glass article.

When the article is a sheet of glass the quenching means comprises parallel quenching frames in spaced relation to direct the gaseous chilling medium onto both faces of the glass sheet, and the thermosensitive control means may apply to the quenching means a control which is sensitive to the surface temperature of the glass sheet.

A further aspect of the present invention resides in a glass article at least a part of which has been toughened by the method according to the invention.

Reference will now be made to the accompanying diagrammatic drawings in which:

FIGURE 1 shows a sheet of glass in a cooling position between two quenching frames, FIGURE 2 shows in block schematic form an arrangement for supplying the cooling medium to a quenching frame, which includes means for regulating the delivery of the cooling medium in accordance with the present invention, FIGURE 3 shows in greater detail one embodiment of the means for regulating the delivery of the cooling medium indicated in FIGURE 2, FIGURE 4 shows one embodiment of a windscreen formed from a sheet of glass of which a part has been toughened by a method according to the invention, FIGURE 5 shows another embodiment of a windscreen formed from a sheet of glass of which a part has been toughened by a method according to the invention, and FIGURE 6 shows a section through a glass insulator which has been toughened by a method according to the invention.

In the drawings the same or similar parts are designated by the same reference numerals.

Referring first to FIGURE 1 of the drawings there is shown a glass sheet 1 in position between two quenching frames 2. The quenching frames 2 are approximately 3 ins. from the respective surfaces of the glass sheet 1. In FIGURE 2 there is shown a motor 3 arranged to drive a pump 4 which pumps the gaseous chilling medium, usually air, into a receiver tank 5 from which it flows through a control valve 6 into a manifold 7 and thence to the quenching frame 2. Only one quenching frame 2 is shown in FIGURE 2, but it is to be understood that the manifold 7 will supply the cooling medium to the quenching frames 2 on both sides of the glass sheet 1 to be cooled, as shown in FIGURE 1.

Mounted at a convenient working distance from the glass sheet 1, that is to say either on the quenching frame 2 or behind it, is an optical pyrometer 8. The pyrometer 8 includes a filter of lead selenide and therefore is sensitive only to radiation in the range of 5 to $9\mu$. The pyrometer 8 thus gives an output which depends on the temperature of the surface layer of the glass sheet 1. The output of the pyrometer 8 is fed to the control valve 6 which regulates the flow of the air to the quenching frames 2 in a predetermined manner. The regulation of the air flow may be either a stopping of the flow, or an increase in the rate of flow, or a decrease in the rate of flow, as will be apparent from the examples which follow.

Referring to FIGURE 3 of the drawings, the control valve 6 consists of a controller 9 which is set to operate at a predetermined voltage output of the pyrometer 8. This output is proportional to the temperature of the glass sheet 1, so that the controller 9 is in fact set to operate at a particular temperature of the surface of the glass sheet 1. The controller 9 controls a relay 10 which operates and the contact 11 of which closes to complete a circuit from a source of potential 12 through a solenoid valve 13. The solenoid valve 13 is therefore operated and will alter the rate of flow of the air in the particular manner desired as will be described in the examples.

While the arrangements of FIGURES 2 and 3 include one pyrometer 8 which effectively measures the surface temperature of the glass sheet 1, it is equally possible to use one duplex pyrometer or two separate pyrometers mounted together on or behind the quenching frame 2, one pyrometer measuring the surface temperautre of the glass sheet (as previously described) and the other pyrometer measuring radiation in wave length range 2.75 to $4.5\mu$ from the whole body including the central portion. The two pyrometer heads are then both connected to the controller 9 through a change-over switching arrangement which will enable either surfaced pyrometer heat to be used alone to operate the controller 9, or both pyrometers to be used together with their outputs adding together or with their outputs in opposition to one another. The two pyrometers would be used with their outputs in opposition when it is desired to determine the temperature difference between the surface of the glass sheet 1 and the centre of the glass sheet, and this is particularly useful when trials are being made to determine the optimum blowing pressure for particular samples of glass sheet.

In the examples which follow the quenching operation is carried out with flat glass which has a relaxation temperature in the range from 480° C. to 550° C. for the rates of cooling which obtain in the toughening of glass. Experiments have shown that relaxation of the stresses in the glass is unlikely to occur under manufacturing conditions when the temperature of the surface of the glass is below 480° C. In each example the glass sheet used had dimensions of 18 ins. x 15 ins. x ¼ in.

Example 1

The sheet of glass is heated in a furnace in the normal way to a temperature of 670° C. The heating is continued until the temperature difference through the glass is substantially zero, that is until the glass is uniformly heated throughout.

The glass sheet is removed from the furnace and immediately placed between the quenching frames 2. The movement of the glass sheet 1 to this position is conveniently a vertical movement which is carried out in a conventional manner. Air is then blown upon the whole surface area of the glass sheet at a pressure of 7 lbs./sq. in., the pressure being measured in the manifold 7 at a distance of 15 ins. from the quenching frames 2.

When the temperature of the surface of the glass sheet 1 has fallen to 440° C., the output of the pyrometer 8 triggers the controller 9 and the solenoid valve 13 is operated to stop the flow of the air. The temperature of the centre of the glass sheet at the time that the flow of cooling medium ceases is approximately 500° C. Once the flow of cooling medium has ceased, the glass sheet is allowed to cool normally. Although the surface temperature of the glass sheet rises after the flow of cooling medium has ceased, this rise is not sufficient to bring the surface temperature up to the relaxation temperature and it is found that the number of fracture particles obtained from the glass treated in this way will be 15 per sq. in.

When batches of glasses toughened according to this method are fractured it is found that the number of particles per sq. in. formed is remarkably consistent from glass to glass compared with the variation found among glasses toughened by normal methods. It is believed that a possible explanation of this is that the surface temperature chosen for stopping the quenching is such that as the temperature gradient through the glass evens out some relaxation of the strain in the central, hotter portion of the glass is possible, and the greater the temperature difference between surface and centre the greater the relaxation possible; thus the final stresses residual in the glass are more consistent since the variations in temperature and stress have been allowed to be substantially self-regulating during the period between the instant the quenching ceases and the instant when the centre of the glass reaches the temperature below which no relaxation of stress is possible.

Example 2

The sheet of glass is heated in a furnace in the normal way until the glass has a surface temperature of 670° C. The furnace temperature used is conveniently about 900° C.

When the glass sheet is removed from the furnace it is immediately quenched with air supplied at a pressure of 7 lbs./sq. in. until the surface temperature of the glass has fallen into 480° C., at which time the temperature of the centre of the glass is approximately 570° C.

The pressure of the air blown is then decreased, by operation of the solenoid valve 13, to 3 lbs./sq. in. and the glass is blown with air at this pressure until the surface temperature reaches 405° C. At this time the temperature of the centre of the glass is approximately 455° C.

This decrease in the air pressure used decreases the rate of cooling as the temperature of the glass falls below the relaxation temperature. The particle count obtained with this method and with the particular sample of glass was 15 per sq. in.

Example 3

The sheet of glass is heated as in the previous examples until the surface temperature of the glass is 670° C. The glass sheet is then removed from the furnace and cooled by cooling air blown from the quenching frames 2 at a pressure of 5 lbs./sq. in. until the temperature of the surface of the glass falls to 495° C., when the temperature of the centre of the glass is approximately 575° C. Operation of the solenoid valve 13 at this point is made to increase the pressure of the air blown to 7 lbs./sq. in. and blowing at this pressure is continued until the surface reaches a temperature of 395° C. The temperature of the centre of the glass sheet is then approximately 435° C.

The particle count obtained in glass treated in this way is 15 per sq. in. The increase in the pressure of the air blown removes the heat more quickly and therefore increases the differential between the surface and the centre as the glass sheet passes through the relaxation temperature.

In the three examples described the particle count throughout the whole of a sheet of glass has been controlled by a method according to the invention, but the method may equally be applied to a part of a glass article, for example in the case of a windscreen for a car or other vehicle it may be desired that a reserved part of the windscreen should, on fracture of the windscreen, break into less small particles than the remainder so that some visibility is retained for the driver of the vehicle.

In one embodiment of the invention, as shown in FIGURE 4, the method according to the invention is applied to the reserved part 14 of a windscreen so that the particle count of this reserved part 14 is controlled, while the main part 15 of the windscreen is toughened in the normal way without any control and will produce very small particles on fracture.

Alternatively, and as shown in FIGURE 5, the part of the windscreen which is toughened in a controlled way is the main part 16, while a reserved part 17 of the windscreen is left untoughened. This is effected by masking the reserved part 17 during the quenching operation.

Although the invention has been described with reference to toughened sheets of glass which may be used as vehicle windscreens or for the glazing of buildings, it is to be understood that the invention also has application in the production of other toughened glass articles, for example the production of electrical insulators for supporting high tension cables. In such an insulator, a part only of the insulator may be toughened so that, for example, there is a barrier to the propagation through the whole insulator of a fracture initiated in a part thereof.

In FIGURE 6 there is shown a typical toughened glass insulator for supporting high tension electric cables, the insulators having a head 18 and a skirt 19 and the underneath of the skirt being formed with annular ribs 20.

We claim:

1. The method of toughening at least a part of a glass article which comprises heating the glass article above the relaxation temperature of the glass, exposing the heated glass article to the quenching action of a gaseous chilling medium directed at a surface of the glass article until said surface is chilled to a controlled temperature not substantially greater than the relaxation temperature of the glass, sensing the temperature of said glass surface while it is being chilled by said chilling medium, and as soon as the glass surface has been chilled to said controlled temperature stopping the delivery of the gaseous chilling medium in response to the temperature sensing of said glass surface to obtain a toughened glass article having a prescribed particle count.

2. The method of toughening at least a part of a glass article which comprises heating the glass article above the relaxation temperature of the glass, exposing the heated glass article to the quenching action of a gaseous chilling medium directed at a surface of the glass article until said surface is chilled to a controlled temperature not substantially greater than the relaxation temperature of the glass, sensing the temperature of said glass surface while it is being chilled by said chilling medium, and as soon as the glass surface has been chilled to said controlled temperature increasing the rate of delivery of the gaseous chilling medium in response to the temperature sensing of said glass surface in a manner to obtain a toughened glass article having a prescribed particle count.

3. The method of toughening at least a part of a glass article which comprises heating the glass article above the relaxation temperture of the glass, exposing the heated glass article to the quenching action of a gaseous chilling medium directed at a surface of the glass article until said surface is chilled to a controlled temperature not substantially greater than the relaxation temperature of the glass, sensing the temperature of said glass surface while it is being chilled by said chilling medium, and as soon as the glass surface has been chilled to said controlled temperature decreasing short of stoppage the rate of delivery of the gaseous chilling medium in response to the temperature sensing of said glass surface in a manner to obtain a toughened glass article having a prescribed particle count.

4. The method of toughening at least a part of a glass article which comprises heating the glass article above the relaxation temperature of the glass, exposing the heated glass article to the quenching action of a gaseous chilling medium directed at a surface of the glass article until said surface is chilled to a controlled temperature not substantially greater than the relaxation temperature of the glass, sensing the energy radiated from the heated glass article being toughened, and as soon as the glass surface has been chilled to said controlled temperature stopping the delivery of the gaseous chilling medium in response to the energy sensed, to obtain a toughened glass article having a prescribed particle count.

5. The method of toughening at least a part of a glass article which comprises heating the glass article above the relaxation temperature of the glass, exposing the heated glass article to the quenching action of a gaseous chilling medium directed at a surface of the glass article until said surface is chilled to a controlled temperature not substantially greater than the relaxation temperature of the glass, sensing the energy radiated from the heated glass article being toughened, and as soon as the glass surface has been chilled to said controlled temperature increasing the rate of delivery of the gaseous chilling medium in response to the energy sensed in a manner to obtain a toughened glass article having a prescribed particle count.

6. The method of toughening at least a part of a glass article which comprises heating the glass article above the relaxation temperature of the glass, exposing the heated glass article to the quenching action of a gaseous chilling medium directed at a surface of the glass article until said surface is chilled to a controlled temperature not substantially greater than the relaxation temperature of the glass, sensing the energy radiated from the heated glass article being toughened, and as soon as the glass surface has been chilled to said controlled temperature decreasing short of stoppage the rate of delivery of the gaseous chilling medium in response to the energy sensed in a manner to obtain a toughened glass article having a prescribed particle count.

7. The method of toughening a glass sheet, which comprises uniformly heating the glass sheet above the relaxation temperature of the glass, exposing the heated glass sheet to the quenching action of a gaseous chilling medium simultaneously directed to both faces of the glass sheet until the surfaces of the glass sheet have been chilled to a controlled temperature which is not substantially greater than the relaxation temperature of the glass, sensing the energy radiated from the heated glass sheet being toughened, and as soon as the surfaces of the glass sheet have been chilled to said controlled temperature stopping the delivery of the gaseous chilling medium in response to the energy sensed to obtain a toughened glass sheet have a prescribed particle count.

8. The method of toughening a glass sheet, which comprises uniformly heating the glass sheet above the relaxation temperature of the glass, exposing the heated glass sheet to the quenching action of a gaseous chilling medium simultaneously directed to both faces of the glass sheet until the surfaces of the glass sheet have been chilled to a controlled temperature which is not substantially greater than the relaxation temperature of the glass, sensing the energy radiated from the heated glass sheet being toughened, and as soon as the surfaces of the glass sheet have been chilled to said controlled temperature increasing the rate of delivery of the gaseous chilling medium in response to the energy sensed in a manner to obtain a toughened glass sheet having a prescribed particle count.

9. The method of toughening a glass sheet, which comprises uniformly heating the glass sheet above the relaxation temperature of the glass, exposing the heated glass sheet to the quenching action of a gaseous chilling medium simultaneously directed to both faces of the glass sheet until the surfaces of the glass sheet have been chilled to a controlled temperature which is not substantially greater than the relaxation temperature of the glass, sensing the energy radiated from the heated glass being toughened, and as soon as the surfaces of the glass sheet have been chilled to said controlled temperature decreasing short of stoppage the rate of delivery of the gaseous chilling medium in response to the energy sensed in a manner to obtain a toughened glass sheet having a prescribed particle count.

10. An apparatus for toughening at least a portion of a glass article which has been heated above the relaxation temperature of the glass, which comprises quenching means for directing a gaseous chilling medium onto at least a part of the heated glass article until the temperature of the surface of the glass article is lowered to a controlled temperature not substantially greater than the relaxation temperature of the glass, thermosensitive means operable automatically in accordance with the temperature of the glass during quenching, and means responsive to the operation of said thermosensitive means and operative as soon as the surface of said glass article has reached said controlled temperature for altering the rate of delivery of the gaseous chilling medium to the glass article to an extent sufficient to obtain a toughened glass article having a prescribed particle count.

11. An apparatus for toughening a glass sheet which has been heated uniformly above the relaxation temperature of the glass, comprising quenching means including two parallel quenching frames in spaced relation for directing a gaseous chilling medium onto both faces of the glass sheet until the temperature of the surfaces of the glass article is lowered to a controlled temperature not substantially greater than the relaxation temperature of the glass, thermosensitive means operable automatically in accordance with the temperature of the glass sheet during quenching, and means responsive to the operation of said thermosensitive means and operative as soon as the surfaces of said glass sheet have reached said controlled temperature for altering the rate of delivery of the gaseous chilling medium onto said faces to an extent sufficient to obtain a toughened glass sheet having a prescribed particle count.

References Cited by the Examiner

UNITED STATES PATENTS

| | | | |
|---|---|---|---|
| 2,695,475 | 11/1954 | Ellis | 65—116 |
| 2,774,190 | 12/1956 | Atkeson | 65—162 X |
| 2,917,871 | 12/1959 | Atkeson | 65—161 |

FOREIGN PATENTS

| | | |
|---|---|---|
| 826,984 | 1/1960 | Great Britain. |

DONALL H. SYLVESTER, *Primary Examiner.*